(12) United States Patent
Kaneko

(10) Patent No.: US 7,039,757 B2
(45) Date of Patent: May 2, 2006

(54) CLUSTER DISK ARRAY SYSTEM AND A METHOD FOR OPERATING THE CLUSTER DISK ARRAY SYSTEM

(75) Inventor: Seiji Kaneko, Zama (JP)

(73) Assignee: Hitachi, Ltd, Tokyo (JP)

( * ) Notice: Subject to any disclaimer, the term of this patent is extended or adjusted under 35 U.S.C. 154(b) by 218 days.

(21) Appl. No.: 10/223,885

(22) Filed: Aug. 19, 2002

(65) Prior Publication Data

US 2003/0163641 A1 Aug. 28, 2003

(30) Foreign Application Priority Data

Feb. 28, 2002 (JP) ............... 2002-053954

(51) Int. Cl.
*G06F 12/00* (2006.01)
(52) U.S. Cl. ...................... 711/114; 711/173
(58) Field of Classification Search ........... 711/112, 711/114, 170, 173; 709/226
See application file for complete search history.

(56) References Cited

U.S. PATENT DOCUMENTS

| | | | |
|---|---|---|---|
| 5,519,844 A | 5/1996 | Stallmo ............ | 711/114 |
| 5,708,769 A | 1/1998 | Stallmo ............ | 714/6 |
| 6,021,442 A * | 2/2000 | Ramanan et al. ........ | 709/238 |
| 6,032,217 A * | 2/2000 | Arnott ................ | 710/200 |
| 6,154,854 A | 11/2000 | Stallmo ............ | 714/6 |

FOREIGN PATENT DOCUMENTS

| | | |
|---|---|---|
| EP | 1132805 A2 * | 9/2001 |
| JP | 2001-027972 | 1/2001 |

OTHER PUBLICATIONS

David A. Patterson, et al., "A Case for Redundant Arrays of Inexpensive Disks (RAID)," Report No. UCB/CSD 87/391 (Dec. 1987), Computer Science Division, University of California (Berkeley), pp. 1-24.

* cited by examiner

*Primary Examiner*—Pierre M. Vital
(74) *Attorney, Agent, or Firm*—Townsend and Townsend and Crew LLP

(57) ABSTRACT

A cluster disk subsystem has a cluster structure formed of a plurality of disk array units connected by a high-speed cluster connection network. When the cluster disk subsystem is operated, logical partitioning is set up to the high-speed connection network to partition the cluster. The cluster disk subsystem is operated under the condition that a disk array unit including a disk array control unit, and the other disk array units are assigned to different users. Thus, when the system is operated, the independency of loads and data can be assured between the users, and the parts of the partitioned cluster can be assigned to different users.

18 Claims, 6 Drawing Sheets

ADDRESS MAP OF SYSTEM

ADDRESS MAP OF SYSTEM

CLUSTER DISK ARRAY SYSTEM AND A METHOD FOR OPERATING THE CLUSTER DISK ARRAY SYSTEM

BACKGROUND OF THE INVENTION

The present invention relates to a cluster disk subsystem capable of dynamic logical partitioning and a method for operating the cluster disk subsystem, and particularly to a cluster disk subsystem improved in its availability, user maintainability and data maintainability and a method for operating that cluster disk subsystem.

The disk subsystem employs RAID technology for improving the transfer performance and fault tolerance of data by parallel accessing to a plurality of disks. This RAID is described in D. A. Patterson et al., A Case for Redundant Arrays of Inexpensive Disks (RAID), December 1987. The disk subsystem using this RAID is now widely used as a large-capacity memory device.

A developed one of this kind is also known as a disk subsystem employing a cluster structure. In the field of server such as database, a method for building up a high-performance, high-reliability system at low cost has been relatively early developed by combining a plurality of independent servers through a high-speed cluster connection network to build the cluster structure. The reason for this is that the combination of a large number of relatively low-performance disk drives connected through the high-speed cluster connection network has been demonstrated to be improved in its cost performance over the construction of a large-scale system formed of only an extremely high-performance storage unit as long as the final system has more than a certain performance. While the disk array units used so far generally have a single controller, the recent disk array units are also considering such construction. For example, JP-A-2001-27972 discloses a method for constructing such disk drives.

For this conventional disk subsystem, there is disclosed a cluster wherein a plurality of disk array units are combined by a high-speed cluster connection network to produce a single system so that it can have expandability and low cost performance. This construction enables the connected systems to be treated as a single system in the maintenance aspect and to be set up like a single system, thus leading to low maintenance cost. The connection by the high-speed cluster connection network increases the cost more or less, but is suited to integrate a plurality of disk subsystems.

Techniques similar to the invention, or not using the cluster but dividing the disk provided within a single disk subsystem and operating is disclosed in U.S. Pat. No. 5,519,844, No. 5,708,769 and No. 6,154,854.

The disk subsystem employing the cluster structure, as described above, is constructed like a single system, or by a plurality of disk subsystems to form a single disk subsystem for use in servers. This system is excellent in maintainability and can reduce the quantity of maintenance work, but has problems caused by the single system. The problems will be mentioned below.

The conventional cluster disk subsystem, even if it is constructed to have enough redundancy, may suffer a failure in one of the disk units affecting over all the system. If a malfunction or bug occurs in the firmware of a processor, the data structure necessary for other disk subsystems might be destroyed. In addition, since the structure of the disk subsystem is certainly large-sized by clustering, and thus becomes more likely to cause a trouble associated therewith, this cluster array system structure will cause a further problem over all the system when it is expanded.

Also, a similar problem occurs when data of each cluster division might leak by intention or by mistake since data are not completely concealed because of data connection between cluster divisions. Although a single disk system has so far caused such trouble, such problem becomes particularly important in the cluster disk subsystem. This is because the cluster disk subsystem is particularly large in its structure and thus used more frequently than the past for may users to store data. For example, in the storage service provider for providing a few disk subsystems exclusively to each user, when groups of the disk arrays are tried to consolidate into a single disk subsystem from the operation point of view, it is important to prevent data from leaking in operation, but means for preventing such outflow of data including a failure has so far not been considered in the conventional disk subsystems.

SUMMARY OF THE INVENTION

It is a first object of the invention to provide a cluster disk subsystem arranged so that even if the system itself is large sized, a trouble occurring at a portion of the system can be prevented from affecting the whole system and that data in one of the disk array units cannot be leaked to the other disk array units.

It is a second object of the invention to provide a method for operating a cluster disk subsystem so that when this system is shared by a plurality of users, mutual independency in load and data can be assured between the users.

The first object can be achieved by setting up logical partitioning to a cluster connection network that interconnects cluster divisions, so that the communication between the cluster divisions can be enabled or disabled while a plurality of disk array units are being operated.

The second object can be achieved by setting up logical partitioning to a cluster connection system so that, when the system is operating, the cluster is partitioned into cluster divisions to be assigned to different users.

According to the invention, there is provided a cluster disk subsystem in which even if the system itself becomes large-sized, a trouble occurring at a portion of the system can be prevented from affecting the whole system, and data in one of the disk array units cannot be leaked to the other ones.

In addition, according to the invention, there is provided a method for operating the cluster disk subsystem, wherein when the cluster disk subsystem is shared by a plurality of users, the cluster disk subsystem can be operated with the independency in loads and data being assured between the users.

BRIEF DESCRIPTION OF THE DRAWINGS

Embodiments of the present invention will now be described in conjunction with the accompanying drawings, in which.

DESCRIPTION OF THE EMBODIMENTS

An embodiment of the invention will be described with reference to the accompanying drawings.

The present invention will first be mentioned briefly. In short, in order to solve the above problems, the cluster disk subsystem itself is constructed to be logically divided or partitioned by units (corresponding to cluster coupling network which will be described later). In other words, the cluster structure is formed to be dynamically changeable at the time of operation so that the above problems can be solved.

By this logical partitioning of a disk array cluster, it is possible to minimize the transmission and reception of data between the disk array units that constitute the cluster in terms of hardware or software, thereby reducing the probability that the influence of a damage is exerted on other disk array units to a minimum, and also decreasing the unexpected leakage of data to a negligible value. On the other hand, data communication is made for only maintenance-purpose information so that the array system is made available as a single system without losing easy operation. In addition, it should be noted that when the cluster is divided or partitioned and operated under this construction, the unbalance of loads between the divided cluster divisions naturally does not affect other disk array unit or units because of the above structure of the portioned cluster divisions.

An embodiment of the invention will be described in detail with reference to FIGS. 1 through 6.

Figure 2:
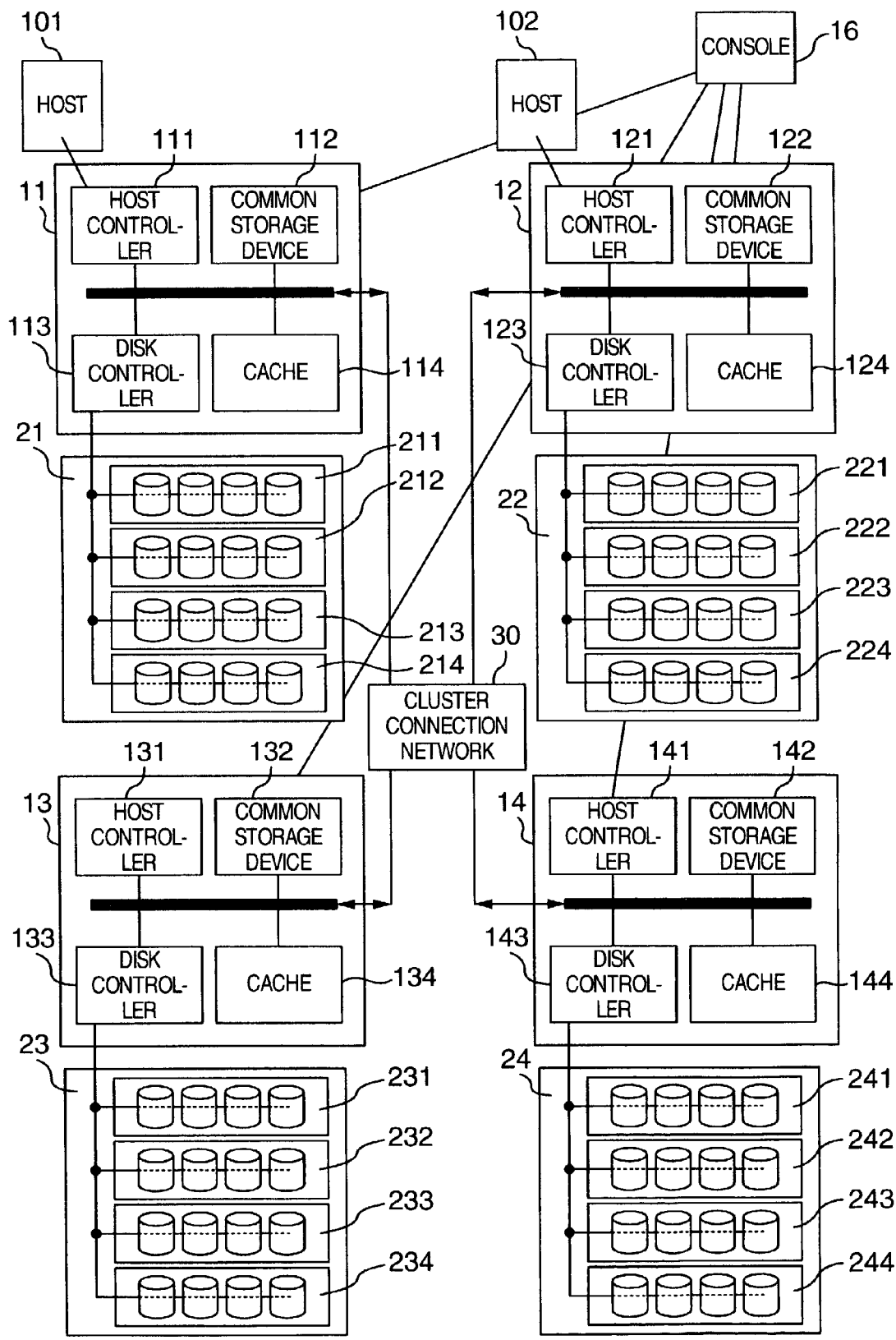
FIG. 2 is a block diagram of one embodiment of the cluster display array system according to the invention.

FIG. 2 shows the construction of an example of the cluster disk subsystem of this embodiment. As illustrated, four disk array control units 11, 12, 13, 14 are provided as RAIDs, connected by a high-speed cluster coupler or network 30. Each of the disk array units has a host controller 111, 121, 131, 141 that serves to connect to an external server or servers (hereafter, simply called host) 101, 102, a disk controller 113, 123, 133, 143 for managing/accessing disk groups, a disk array 21, 22, 23, 24 connected to the disk controller 113, 123, 133, 143, a cache storage device 114, 124, 134, 144, and a common storage device 112, 122, 132, 142 in which information for managing the cache storage device 114, 124, 134, 144 and the whole system is stored.

Here, some of the above constituent elements will be further described. The disk array 21, 22, 23, 24 is formed of disk array groups of 211~214, 221~224, 231~234, 241~244 as illustrated. In addition, the cache storage device 114, 124, 134, 144 is used to cache the readout of disk data from the host 101, 102. The common storage device 112, 122, 132, 142 is used to store control information in the disk array units. Also, it is assumed that a specific disk array unit number is attached to each of the four disk array units that constitute the cluster. For example, the disk array unit including the disk array control unit 11 is numbered "1" as the disk array unit number, the disk array unit including the disk array control unit 12 as "2", the disk array unit including the disk array control unit 13 as "3", and the disk array unit including the disk array control unit 14 as "4".

In this embodiment, the four disk array units constituting the cluster disk subsystem each individually processes the access from the host 101, 102. That is, each disk array unit has its separate contents stored in the common storage device not used by the other disk array units, and thus does not require the information stored in the other disk array units to make the processing. When the processing between the disk array units is to be made, however, it is necessary for each disk array unit to refer to or update the contents of the common storage devices of the other disk array units that constitute the cluster construction between them. Therefore, according to this embodiment, each disk array unit of the cluster disk subsystem can refer to or update (hereafter, referred to as access) the resources (specifically, the cache storage devices and common storage devices) of the other disk array units that constitute the cluster). How to access in that case will be described below.

When access is made from the host to the subsystem and the requested data of said access is in this subsystem, number "0" (pseudo-number) is used to specify one so that the number "0" and an address of, for example, 48 bits are used for the access. The address space of the common storage devices are given independent of the cache storage devices. On the other hand, access to other disk array units will employ the specific unit number and the address of 48 bits.

Maintenance-related information can be stored in the head region of 1 MB of the common storage device of each disk array unit.

Under this coordinated access operation over the information staring disk array units, this cluster disk subsystem is logically partitioned during the operation so that the cluster resulting from the division can be assigned to and used by different users. This logical partitioning is executed by ordering the cluster coupler 30 to separate the units by software as mentioned below.

Figure 1:
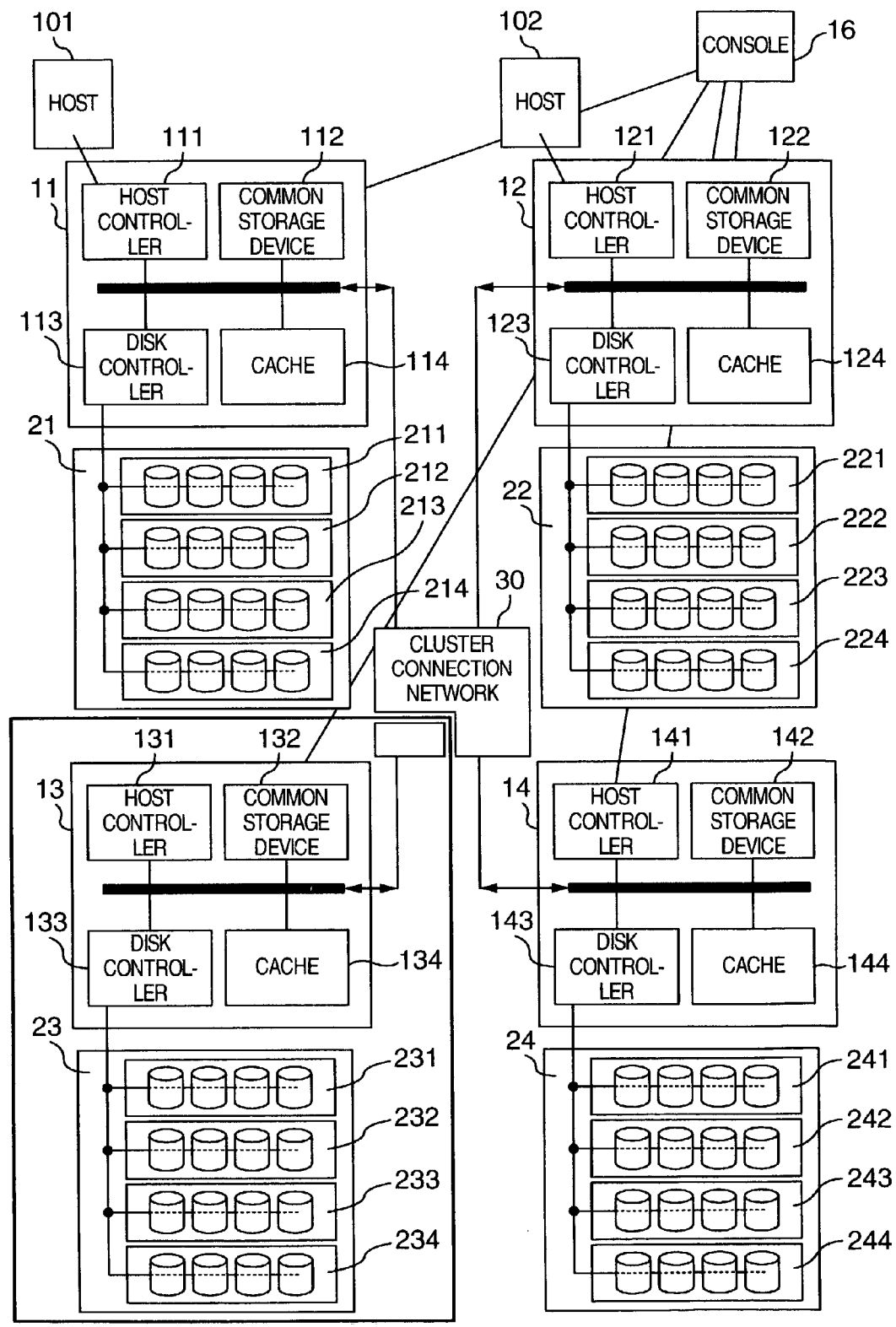
FIG. 1 is a block diagram of a cluster disk subsystem formed of four disk array units of which one is disconnected so that logical partitioning is performed.
Figure 3:
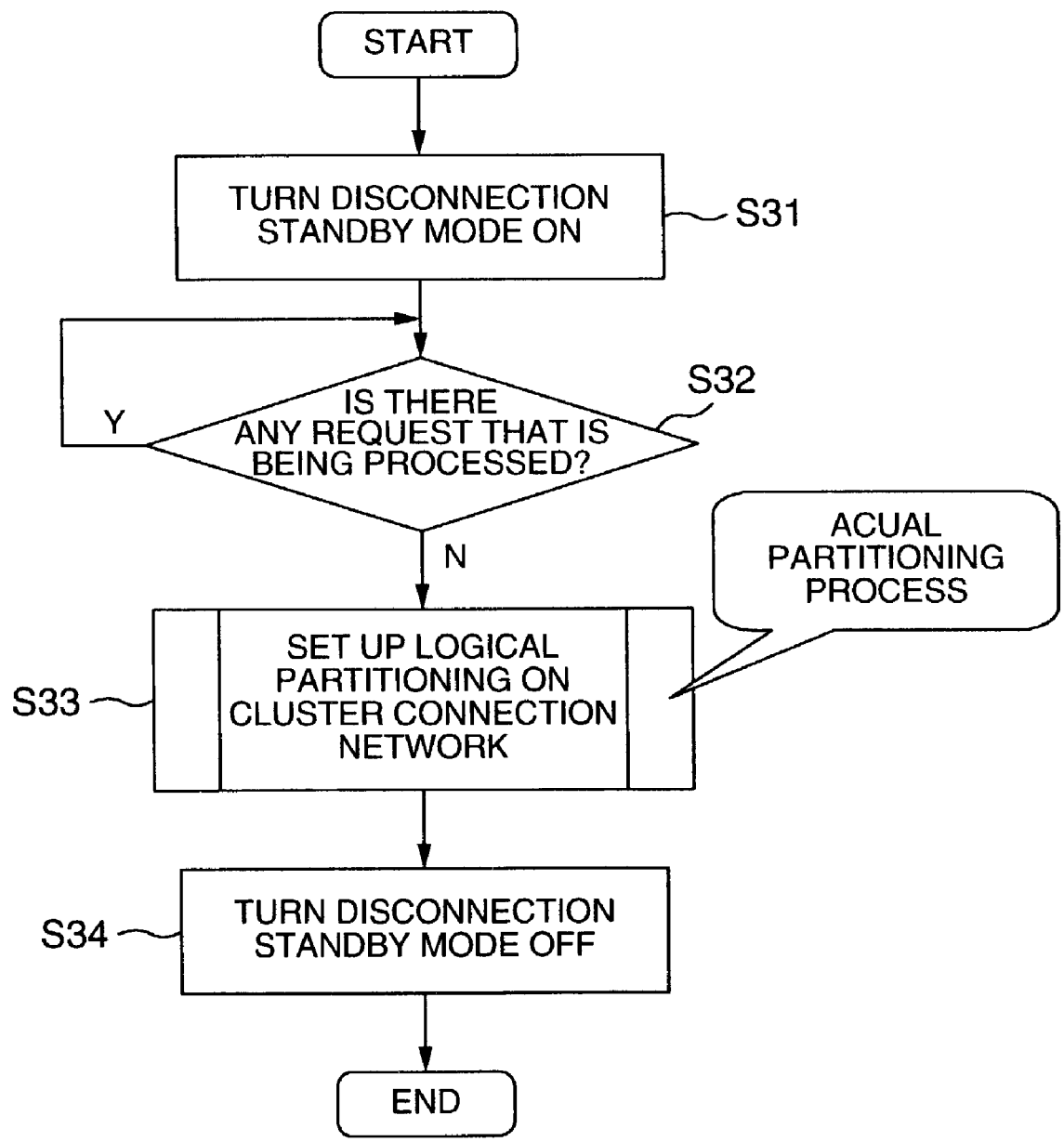
FIG. 3 is a flowchart showing the logical partitioning of the cluster display array system.
Figure 4:
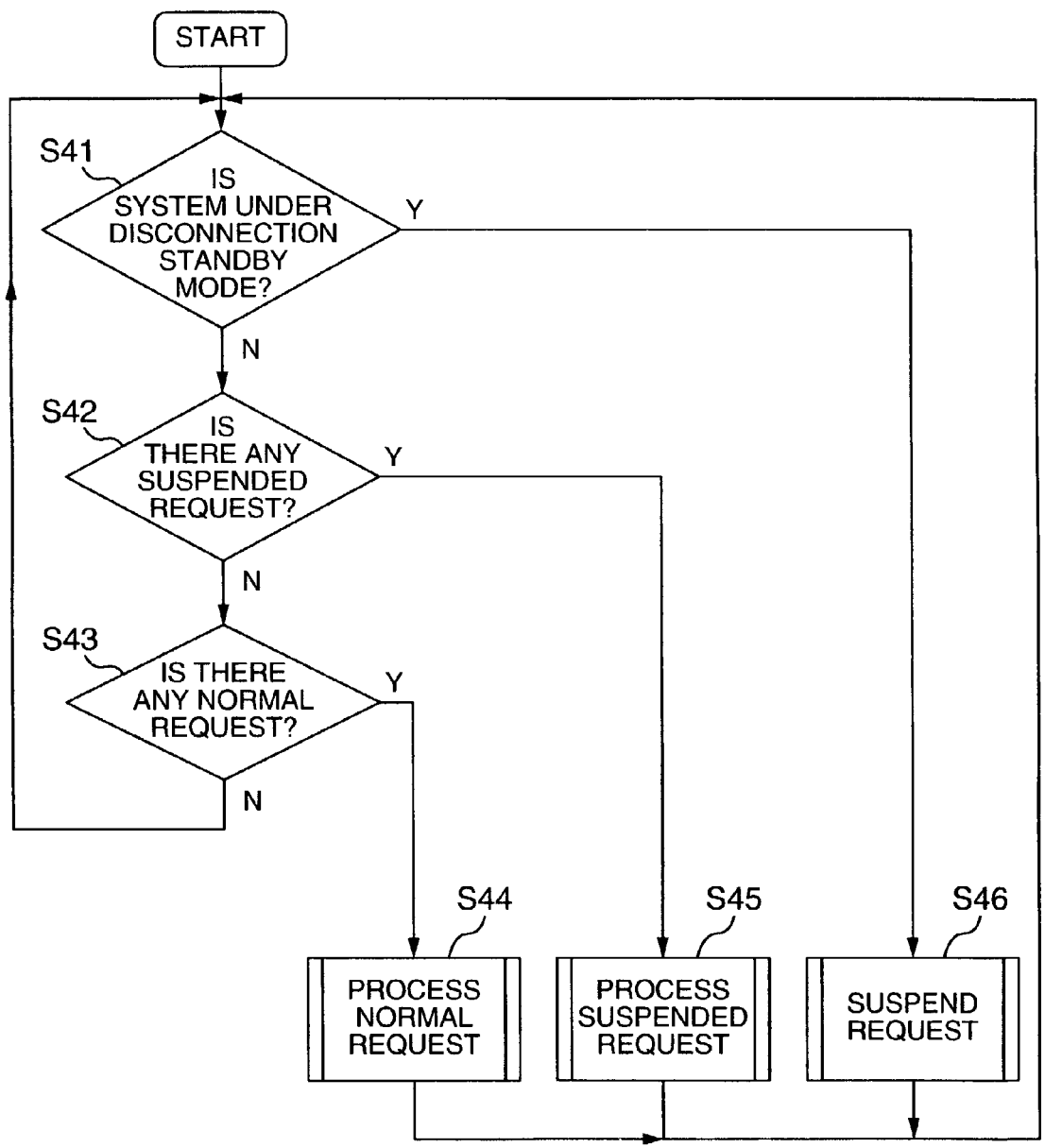
FIG. 4 is a flowchart showing the procedure to process the request from a host when the cluster display array system is logically partitioned.

When the cluster disk subsystem formed of the four disk array units is logically partitioned so that the disk array unit numbered "3" is separated from the others as shown in FIG. 1, the logical partitioning processing is made as shown in the flowchart of FIG. 3, and the request from the host is processed as in the flowchart of FIG. 4. As seen in the flowcharts, the whole system is switched to a disconnection standby mode (step 31). Under this disconnection standby mode, the request from the host that has used the disk array unit now to be disconnected is processed until the processing is finished, but the request received from the host after entering into the disconnection standby mode is completely suspended not to process (steps S41, S46). When the requests from the host have been completely processed, the conformance of the maintenance information stored in the first 1-MB region of the common storage device is confirmed. In this case, if the update of the maintenance information is pendent because of the processing of other requests, this maintenance information is updated.

When it is confirmed that there is left no request from the host, the cluster coupler 30 is ordered to make logical partitioning (steps S32, S33), the cluster coupler 30 is switched to the logical partitioning mode in which the disk array unit numbered "3" is ordered to disconnect, so that no data transfer be made between the disk array unit to be disconnected and other disk array units. Then, the disconnection standby mode is released (step 34). When the disconnection standby mode is released, the requests suspended so far (suspended requests) are processed (steps S42, S45), and normal requests (non-suspended requests) are processed (S43, S44).

This disconnection operation will be made when a maintenance worker orders the system through a console 16 provided on the cluster disk subsystem, but the logical partitioning operation is not frequently made. The system construction change is assumed to cause the logical partitioning in typical case, but in some cases the construction may be changed depending on several time zones. In such case, the construction will be changed once every several hours. In view of the above aspects, this embodiment once restrains or suspend the access from the host, or the request from the host before the logical partitioning is made. The fact that the requests from the host are equally restrained in the above processing procedure leads to a simple method for making the host not see that the accessing order is changed from the access, which will cause an error, to the disconnected disk array unit (numbered "3") to any other, not disconnected, disk array units (numbered other than "3") when the corresponding unit is disconnected from the other units. If this order control is considered enough, the processing procedure can be executed at high efficiency.

In the above processing procedure, the requests from the host in the disconnection standby mode are all suspended for simplicity. For example, the requests, which are received from the host by any other disk array unit (numbered other than "3") that uses the resources of the disk array unit (numbered "3") to be disconnected, are suspended. The other requests from the host are processed as long as they do not cause troubles in terms of the processing order. The host requests received by the disk array unit (numbered "3") to be disconnected are suspended when using the resources of any other disk array units (other than the units "3"). Also, if the other host requests are processed as long as they do not cause troubles from the processing order standpoint, the processing can be made more effectively. In addition, by paying much attention to the order of whether either error or normal processing is first processed, it is possible to precedently send the error back as can be easily understood from the above description.

The cluster coupler 30 in this embodiment does not employ a special hardware structure except that the logical partitioning can be set by software. Although it can be supposed that, in this embodiment, various kinds of logical partitioning can be realized by changing the register address-mapped within the cluster coupler 30, the various kinds of logical partitioning can also be established by externally controlling the cluster coupler 30 having appropriate means incorporated, as will be easily understood by those skilful in the art.

While this embodiment takes a construction by which the logical partitioning of the system including the maintenance region is completely performed by control even during the normal running time, it is possible to take such a construction that, at the time of division, the paths between the cache storage devices 114, 124, 134, 144 are separated and the paths between the common storage devices 112, 122, 132, 142 are opened to allow the communication only for some region, for example, the maintenance-purpose region. In that case, the cluster coupler 30, for example, decides by address comparison if the asserted addresses are for the maintenance-purpose regions of the common storage, and permits only the access to the maintenance-purpose region to pass. This construction will be easily understood by those skilful in the art.

On the other hand, the disconnected disk array unit or a newly installed disk array unit cannot be automatically connected to the cluster disk subsystem unlike the case of logical partitioning. The reason for the above is that, since the disks of an entirely newly installed disk array unit are not used in the initial state, the newly assigned portion can be exclusively used for a new disk area even though only the port-side may be used. Although the above case in this embodiment does not cause any trouble in operation, it is also possible to solve this problem by combining with a method for producing a plurality of copies of disk data and dividing them so as to utilize the disk regions connected to a newly installed disk array unit, as will be easily understood by those skilful in the art.

Moreover, according to this embodiment, it will be apparent that data separability can be naturally assured between the divided disk array units and that the load between the disk array units does not affect the disconnected side. Thus, the disk subsystem can greatly reduce the operational load.

While the above embodiment uses the console 16 provided on the cluster disk subsystem so that the maintenance worker can order the cluster coupler 30 to make logical partitioning by way of the console, the system can be operated so that the logical partitioning mode can be changed depending on time zone as described previously. In that case, a control program operating on the disk subsystem can be executed according to previously given commands to disconnect and reconnect at specified times, as will be understood by those skilful in the art.

In addition, while the disk array units are operated somewhat independently in the above embodiment, close coupling can be taken in, whereby sharing the cache storage device 114, 124, 134, 144 and common storage device 112, 122, 132, 142 within other disk array units which can be utilized without knowing what disk array unit has such storage devices wherein the processing for disconnecting some of the disk array units is made sometimes easily or somewhat restricted a in other cases depending on the hardware construction. A modification of this embodiment, in connection with this case, will be described below. This modification is concerned with the control of units by software made in the system structure shown in FIG. 2.

Figure 5:
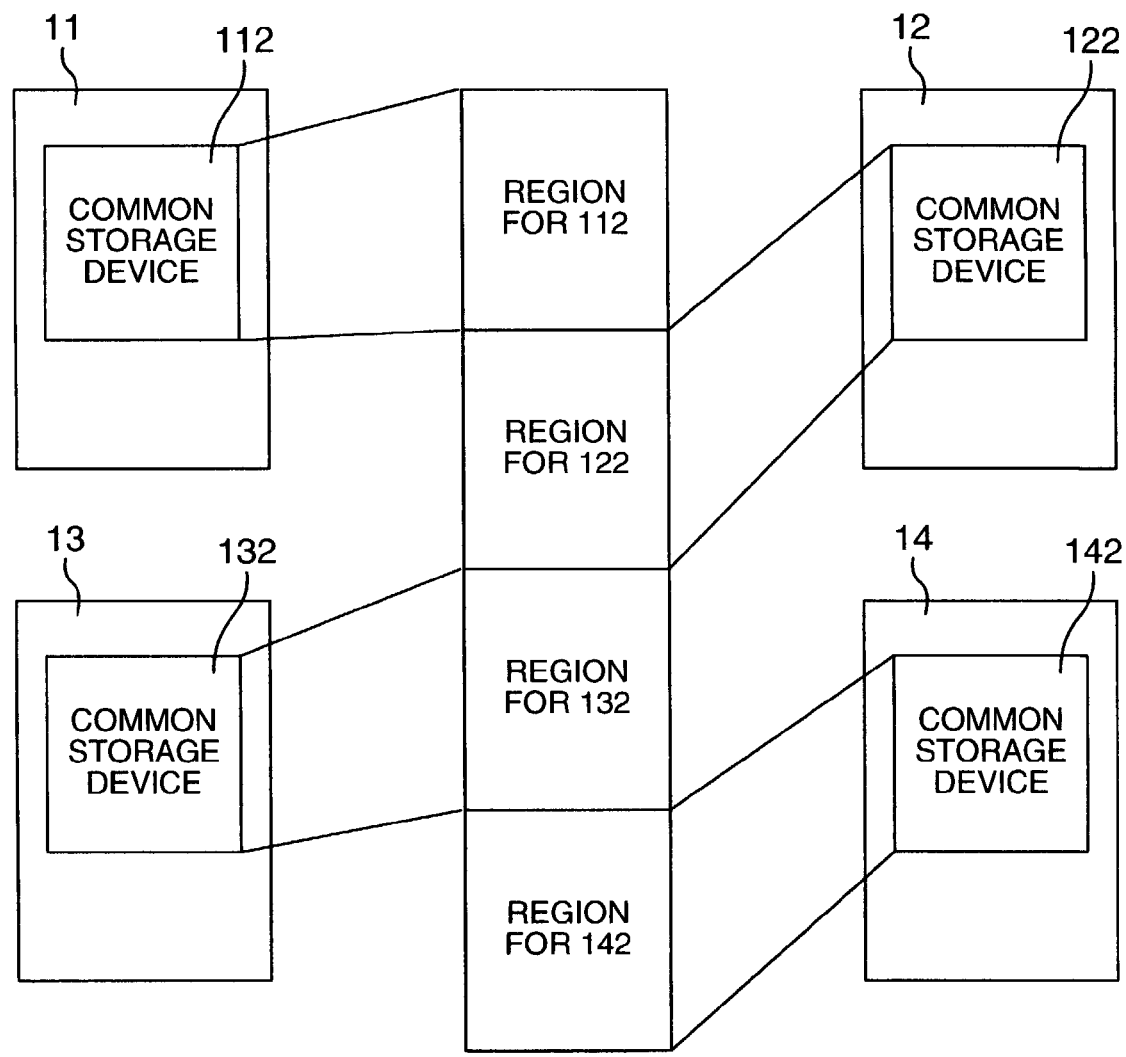
FIG. 5 is a diagram showing an example of the address map necessary for the embodiment of the invention.

That is, when the common storage devices and cache storage devices are placed in close units on the address map of the system as shown in FIG. 5, even the dividing or partitioning process that may take a long time, can be simply performed by properly separating the areas of cache storage devices so as to disconnect the resources of the disk array unit. Although the common storage devices 112, 122, 132, 142 can be separated for respective subsystems if necessary, the cache storage devices 114, 124, 134, 144 are more often disconnected effectively in terms of load in this embodiment. Such processing can be achieved easily. For example, during the time all data between the cache storage devices 114, 124, 134, 144 are forced written back to the disks, the accessing host newly reassigns the cache storage device 114, 124, 134, 144 of each disk array units.

Figure 6:
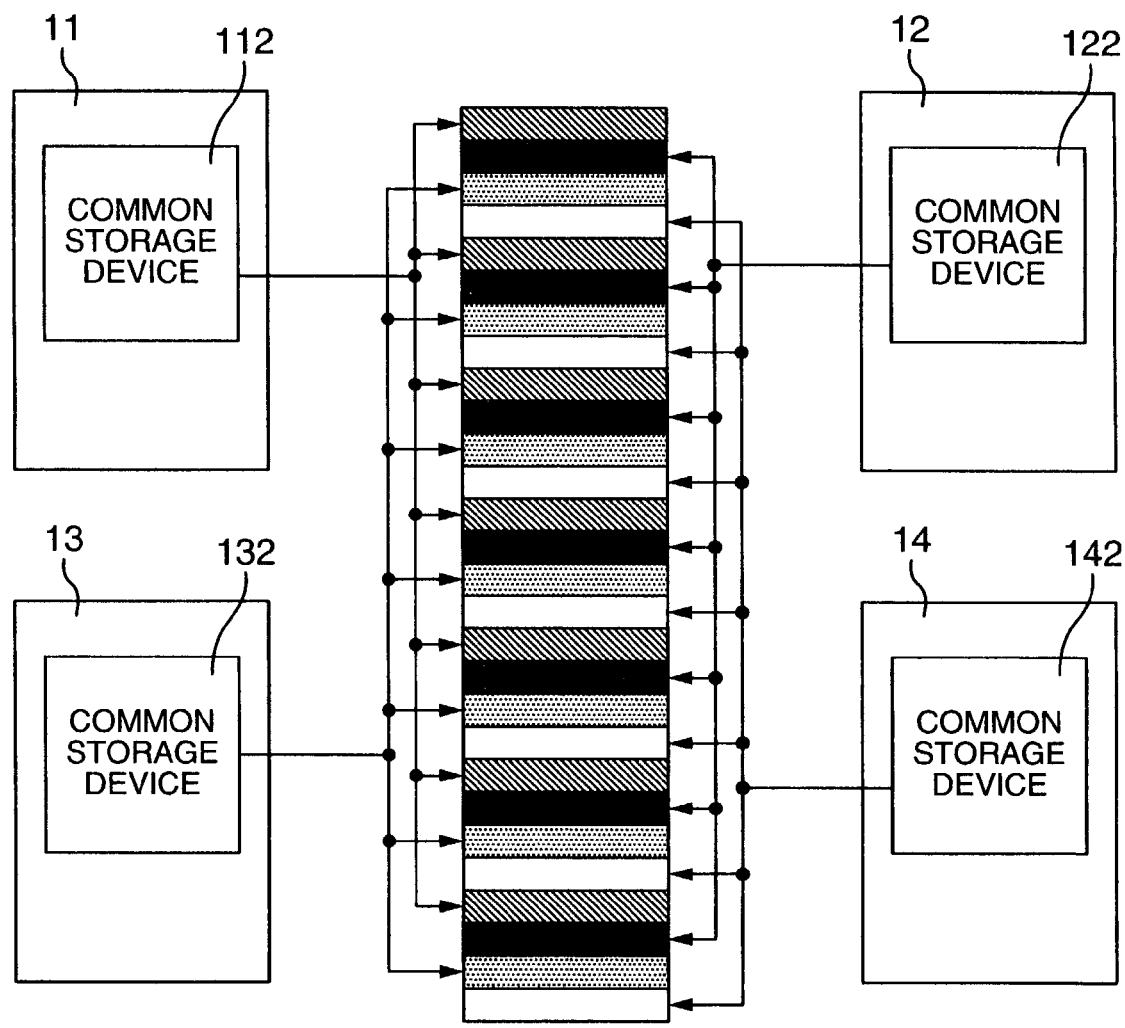
FIG. 6 is a diagram showing another example of the address map necessary for the embodiment of the invention.

The difficulty in embodying the invention is that, as shown in FIG. 6, addresses are uniformly arranged by interleaving. In that case, some hardware support is necessary. In this construction, however, in order to support the construction for the disk array units disconnected and or to be disconnected at the time of maintenance, it is necessary to have an interleaving control logic established by some hardware. By that logic, it is possible to embody the present invention as in the above embodiment.

Thus, when a single cluster disk subsystem is shared by a plurality of users, the logical partitioning of the system can be performed in various modes that are excellent in data separability and operationality and rich in expandability, and an operation method can be offered when the system itself has been logically partitioned.

Japanese Patent Application No. 2002-53954 filed Feb. 28, 2002 in Japan, which becomes the basis for this application is incorporated herein by reference.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A cluster disk subsystem comprising:
   a plurality of disk array units arranged in a cluster structure, each disk array unit including a plurality of disk drives, a common storage, and a controller to read and write data from and to said disk drives, said controller including a storage to store data from a host computer and a control information storage to store information to control said disk array units by said controller; and
   a cluster connection network for coupling said plurality of disk array units in said cluster structure,
   wherein logical partitioning is established through said controller of each disk array unit and said cluster connection network,
   wherein said controller of each disk array unit executes, for a first mode, communication between said plurality of disk array units to occur when processing among some units of said plurality of disk array units be done by referring to contents of control information storages in others of said plurality of disk array units,
   wherein when said cluster connection network receives a request from said host computer to disconnect a first of said disk array units from a remainder of said disk array units, then for a second mode said controller of each disk array unit prohibits communication between said plurality of disk array units other than said first disk array unit such that at least part of said common storage of said first disk array unit which is used for maintenance is kept communicating when processing in said first disk array unit be done by referring to contents of said common storage in said first disk array unit.

2. A cluster disk subsystem according to claim 1, wherein said plurality of disk array units each has its own ID, and said logical partitioning under said second mode enables said cluster disk subsystem to be switched to said first mode in which the end of the processing on a request from said host computer can be confirmed and wherein said first disk array unit specified by said ID can be disconnected from said other disk array units.

3. A cluster disk subsystem according to claim 2, wherein said logical partitioning under said second mode allows processing caused by said request, under processing, from said host computer to continue to be processed when said first mode is brought about, and requests received from said host computer after the switching to said first mode to be suspended, and wherein said suspended requests from said host computer are processed after said first disk array unit is disconnected from said other disk array units.

4. A cluster disk subsystem according to claim 2, wherein said logical partitioning allows processing caused by said request, under processing, from said host computer to continue to be processed when said first mode is brought about, makes it possible to suspend requests sent from said host computer, and, in response to a second request accepted by a second disk array unit other than said first disk array unit after said first mode is switched to and supposed to be processed by using said first disk array units, enables said suspended requests from said host computer to be processed after said first disk array units is disconnected from said other disk array units.

5. A cluster disk subsystem according to claim 2, wherein said logical partitioning allows processing caused by said request, under processing, from said host computer to continue to be processed when said first mode is brought about, makes it possible to suspend requests sent from said host computer, and, in response to a second request accepted by said first disk array unit after said first mode is switched to and supposed to be processed by using a second disk array unit other than said first disk array units, enables said suspended requests from said host computer to be processed after said first disk array unit is disconnected from said other disk array units.

6. A cluster disk subsystem according to claim 2, wherein said logical partitioning allows processing caused by said request, under processing, from said host computer to continue to be processed when said first mode is brought about, makes it possible to suspend requests sent from said host computer, and, in response to a second request accepted by said first disk array unit after said first mode is switched to and supposed to be processed by using said first disk array units, enables said suspended requests from said host computer to be processed after said first disk array units is disconnected from said other disk array units.

7. A cluster disk subsystem according to claim 2, wherein said logical partitioning allows processing caused by said request, under processing, from said host computer to continue to be processed when said first mode is brought about, makes it possible to suspend requests sent from said host computer, and, in response to a second request accepted by a second disk array unit other than said first disk array unit after said first mode is switched to and supposed to be processed by using said second disk array unit, enables said suspended requests from said host computer to be processed after said first disk array units is disconnected from said other disk array units.

8. A cluster disk subsystem according to claim 1, further comprising:
   a control program produced to operate on said plurality of disk array units, wherein said logical partitioning to said cluster connection network is established by said control program.

9. A cluster disk subsystem according to claim 1, further comprising:
   a console on which the logical partitioning to said cluster connection network is made.

10. A cluster disk subsystem according to claim 9, wherein said console sets up the logical partitioning with said cluster connection network so that said cluster disk subsystem can be operated as two or more disk cluster subsystems.

11. A cluster disk subsystem according to claim 1, wherein
   each of said disk array units further comprises a cache storage device for caching data readout from disk data; and
   wherein said cluster disk subsystem further comprises paths for connecting said cache storage devices of said plurality of disk array units,
   wherein a first path that connects a cache storage of said first disk array unit disconnected from said other disk array units is disconnected from others of said paths.

12. A method for operating a cluster disk subsystem with a plurality of disk array units, each disk array unit including a plurality of disk drives, a common storage, and a controller to read and write data from and to said disk drives, said controller including a storage storing data from a host computer and a control information storage storing information thereby to control said plurality of disk array units by said controller connected by a cluster connection network to form a cluster structure, said method comprising the steps of:

setting up logical partitioning via said cluster connection network in said cluster subsystem; and partitioning said cluster disk array system with a plurality of disk array units kept operative to execute, for a first mode, communication between said plurality of disk array units to be made when a processing among some units of said plurality of disk array units be done by referring to contents of control information storages in other of said plurality of disk array units, and to prohibit, for a second mode in response to said cluster connection network receiving a reciuest from said host computer to disconnect a first of said disk array units from others of said disk array units, communication between said plurality of disk array units other than said first disk array unit wherein at least part of said common storage of said first disk array unit which is used for maintenance is kept communicating when a processing in said first disk array unit be done by referring to contents of said common storage device in said first disk array unit.

13. A method according to claim 12, wherein each of said plurality of disk array units has its own ID, and said step of partitioning said cluster disk subsystem under said second mode includes the steps of:

switching said cluster disk subsystem to said first mode;

confirming that a request received from said host computer and under processing has been completely processed when said first mode is brought about; and disconnecting a first disk array unit specified by said ID from said other disk array systems.

14. A method according to claim 13, wherein said step of partitioning said cluster array system further includes the steps of:

processing said request from said host computer that is being processed when said first mode is brought about by switching;

suspending requests received from said host computer after said system is switched to said first mode; and processing said suspended requests after said first disk array unit is disconnected.

15. A method according to claim 13, wherein said step of partitioning said cluster disk subsystem includes the steps of:

processing said request from said host computer that is being processed when said first mode is brought about by switching;

suspending requests from said host computer, accepted by a second disk array unit other than said first disk array unit after said first mode is brought about by switching, and supposed to be processed by using said first disk array unit; and processing said suspended requests from said host computer after said first disk array unit is disconnected.

16. A method according to claim 13, wherein said step of partitioning said cluster disk subsystem includes the steps of:

processing a request from said host computer that is being processed when said first mode is brought about by switching;

suspending requests from said host computer, accepted by said first disk array unit after said first mode is brought about by switching, and supposed to be processed by using a second disk array unit other than said first disk array unit; and processing said suspended requests from said host computer after said first disk array unit is disconnected.

17. A method according to claim 13, wherein said step of partitioning said cluster disk subsystem includes the steps of:

processing a request from said host computer that is being processed when said first mode is brought about by switching;

suspending requests from said host computer, accepted by said first disk array unit after said first mode is brought about by switching, and supposed to be processed by using said first disk array unit; and processing said suspended requests from said host computer after said first disk array unit is disconnected.

18. A method according to claim 13, wherein said step of partitioning said cluster disk subsystem includes the steps of:

processing a request from said host computer that is being processed when said first mode is brought about by switching;

processing requests from said host computer, accepted by a second disk array unit other than said first disk array unit after said first mode is brought about by switching, and supposed to be processed by using said second disk array unit; and processing said suspended requests from, said host computer after said first disk array unit is disconnected.

* * * * *